Dec. 30, 1924.

J. B. SECHRIST

BED HOOK PIN

Filed March 31, 1924

1,520,890

James B. Sechrist,
Inventor

By Clarence A. O'Brien
Attorney

Patented Dec. 30, 1924.

1,520,890

UNITED STATES PATENT OFFICE.

JAMES B. SECHRIST, OF RED LION, PENNSYLVANIA.

BED HOOK PIN.

Application filed March 31, 1924. Serial No. 703,226.

*To all whom it may concern:*

Be it known that I, JAMES B. SECHRIST, a citizen of the United States, residing at Red Lion, in the county of York and State of Pennsylvania, have invented certain new and useful Improvements in Bed Hook Pins, of which the following is a specification.

This invention relates to bed hook pins, especially adapted for use with wooden beds. An object of the invention is to provide a bed hook pin, having a cylindrical pin body formed at one end with a lateral extension, adapted to have the body inserted in the usual pin opening of a bed post, for cooperation with the hooked extensions on the plate carried by the side bars and securing the bed in assembled relation, and the extension secured to the sides of the bed post at a point remote from the pin and slot for preventing the stresses applied to the pin in use, from pulling out or breaking the bed post, in the ordinary use of the bed.

Another object of the invention resides in providing a hook pin for beds, having a cylindrical body portion and an anchor extension, adapted for positioning in the pin opening of a bed post with the anchor extensions extending in line with the line of stress on the pin and secured to the bed post at a point remote from the pin, in order to prevent the stress applied to the pin, from splitting the bed post, in the case of wooden beds, in the ordinary use of the bed.

The invention further comprehends the provision of a hook pin which is well adapted for use in the side bars of a bed for anchoring the hook plates thereto and prevent splitting of the bars by providing a securing point for the pin beyond the slotted portion of the side bars receiving the hook plates.

The invention includes other objects and improvements in the details of construction of the pin, for carrying out the above objects, which are more particularly pointed out in the following detailed description, and in the claims, directed to the preferred form of the invention, it being understood, however, that slight variations may be made, within the scope of the description and claims.

In the drawings, forming a part of the application:

1 indicates a bed post, on any desirable form of bed, wherein the side boards of the bed are provided with plates having hooked extensions, for cooperation, and connection with pins extending through slots as indicated at 2, in the bed post, for securing the head, the foot, and the several parts of tne bed in assembled relation, for receiving the springs and mattress, in a manner well known in the art. In a construction of this character, the bed post is usually provided with an opening as indicated at 3, extending partially througn the bed post, and at substantially right angles to the slot 2, for receiving the pin which cooperates with the hook extension on the plate carried by the side boards.

Figure 1:
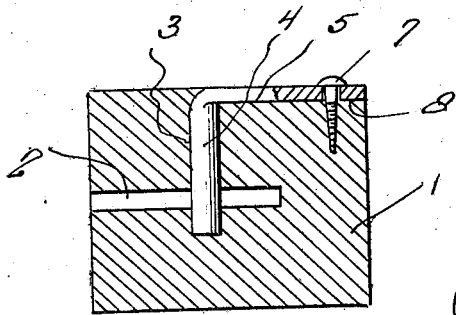
Figure 1 is a horizontal sectional view, through a bed post equipped with a pin constructed according to this invention.
Figure 2:
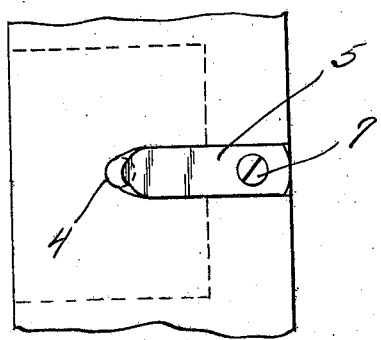
Figure 2 is a side elevation of the bed post.

In the present invention, the pin for cooperation with the hook, includes a rod like, or cylindrical pin body as indicated at 4, which is adapted to entirely fit within the bore 3 in the bed post, which is provided at one end with a lateral extension 5, which is flat in form, and is provided adjacent the ends with an opening 6, for receiving an anchoring screw 7, the extension 5 being adapted to seat in a groove 8, formed in the bed post, as clearly shown in Figures 1 and 2 of the drawings.

From this construction, it will be seen that the screw 7 provides an efficient means for anchoring the extension 5, to provide an additional means of holding the pin in connection with the bed post, and for distributing the stress applied to the pin body 4, over a greater area of the bed post. In the construction as shown, the extension 5 is seated or positioned in the bed post, so that it will be in line with the side bars, and will thereby operate in connection with the pin body 4, in such a manner that the stress applied to the pin body 4, will be distributed in line with the extension 5 to the back portion of the bed post, which will effectively prevent the forward portion being broken away or pulled out by reason of the weakened part of the post contiguous to the slot 2.

Figure 4:
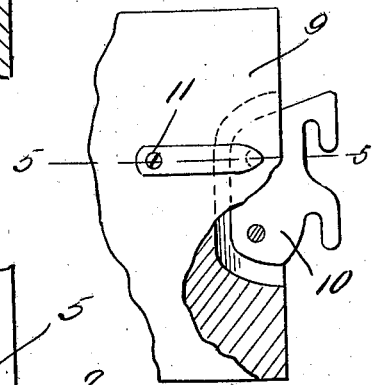
Figure 4 is a detail view of the end of a side bar of a bed showing the hook plate secured thereto by the hook pins constructed according to the invention.
Figure 5:
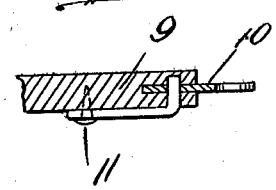
Figure 5 is a horizontal section through the side bar and hook plate shown in Figure 4.
Figure 3:
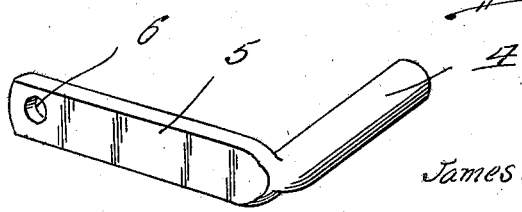
Figure 3 is a detail perspective view of the bed hook pin.

The hook pin is shown in Figures 4 and 5, as applied to the side bar 9 of a bed for anchoring the hook plate 10 therein, the pin being mounted and functioning in this use in the identical manner of its functioning in the bed post. The securing screw 11 anchors the extension 5 beyond the slot receiving the hook plate, in a manner clearly shown in Figures 4 and 5.

It will therefore be clear that a novel form of hook pin for bed posts and side bars has been provided, which will more evenly distribute the stress applied thereto over the section of the post or the side bar to reduce the tendency of the post or side bar to split under the ordinary strain applied to the pin, which is accomplished in an efficient and simple manner, as above described.

What is claimed is:

1. A bed hook pin for beds, wherein the bed includes head and foot portions having posts for supporting the bed, each post being formed for removably receiving and holding a securing plate carried by the end of a side bar of the bed, the end of said side bar being formed with a recess for receiving a portion of the securing plate and having transverse openings for registry with openings in the securing plate; comprising a cylindrical body portion adapted to seat and fit in the transverse opening in the side bar and the opening in the securing plate, one end of said body having a flat lateral extension adapted to fit against the side bar and extend to a point beyond the recess portion thereof, and securing means for fastening the ends of said lateral extensions to the side bars beyond the recessed portion, and thereby holding the securing plate in the side bar and distributing the stress applied to the cylindrical body portion over a substantially large area.

2. A bed hook pin for beds, wherein the bed includes a head and foot portion having posts formed with slots for receiving the hooked extensions of the securing plates on the side bars, and pin openings extending transversely to the slots, comprising a cylindrical body portion adapted to seat and fit in the pin opening of the post, one end of said body having a flat lateral extension adapted to seat against the bed post and secured thereto beyond the portion formed with the slot, for distributing the stress applied to said pin by the hook extension, over a larger area of the bed post, when the bed parts are in assembled relation.

3. A bed hook pin for beds, wherein the bed includes head and foot portions having posts formed with slots for receiving the hook extensions of the securing plates of the side bars, and pin openings extending transversely to said slots comprising a body portion adapted to seat in said pin opening in the bed post, having a lateral extension from one end thereof adapted to seat in a groove in the bed post in line with the side bars, and anchoring means for securing said extension to the bed post beyond the slotted portion thereof, for distributing stress applied to the pin over a substantial section of the bed post, in line with the direction of application thereof.

In testimony whereof I affix my signature.

JAMES B. SECHRIST.